United States Patent [19]
Wynne et al.

[11] Patent Number: 5,692,327
[45] Date of Patent: Dec. 2, 1997

[54] ILLUMINATED LICENSE PLATE

[75] Inventors: Eric D. Wynne, Matteson; Doyle P. Skinner, Hawthorn Woods; Jeffrey S. Williams, Warrenville, all of Ill.

[73] Assignee: Illuminating Cars Uniquely, Ltd., Matteson, Ill.

[21] Appl. No.: 599,481

[22] Filed: Jan. 23, 1996

[51] Int. Cl.[6] .................................................. G09F 13/08
[52] U.S. Cl. .............................. 40/205; 40/544; 362/812
[58] Field of Search ........................... 40/544, 204, 205, 40/580; 362/84, 812

[56] References Cited

U.S. PATENT DOCUMENTS

| | | |
|---|---|---|
| 1,089,014 | 3/1914 | Schieb et al. . |
| 1,503,509 | 8/1924 | Kramer . |
| 1,568,915 | 1/1926 | Parkes . |
| 1,697,657 | 1/1929 | Moore . |
| 1,809,524 | 6/1931 | Moore . |
| 2,015,513 | 9/1935 | Caiati . |
| 2,147,560 | 2/1939 | Schupbach . |
| 2,875,539 | 3/1959 | Gladd . |
| 3,188,761 | 6/1965 | Harrold . |
| 3,521,391 | 7/1970 | Murai . |
| 3,680,237 | 8/1972 | Finnerty, Sr. ............................. 40/544 |
| 3,921,324 | 11/1975 | Flannery . |
| 4,138,620 | 2/1979 | Dickson ................................ 40/544 X |
| 4,255,887 | 3/1981 | Murai . |
| 4,443,832 | 4/1984 | Kanamori et al. ........................ 362/84 |
| 4,475,298 | 10/1984 | Munoz . |
| 5,073,842 | 12/1991 | Monroe . |
| 5,214,870 | 6/1993 | Cohen ................................. 40/580 X |
| 5,339,550 | 8/1994 | Hoffman ............................. 40/204 X |
| 5,444,930 | 8/1995 | Loew ................................... 40/544 |

*Primary Examiner*—Brian K. Green
*Attorney, Agent, or Firm*—Leydig, Voit & Mayer, Ltd.

[57] ABSTRACT

An improved illuminated license plate comprising a support, an electroluminescent sheet, and a facing sheet. The support includes a rigid, nonopaque plate. The rigid support plate has a front surface and a back surface. An electroluminescent sheet is mounted on the back surface of the support plate, preferably in a recess provided in the back surface for such purposes. The facing sheet is nontransparent and is affixed to the front surface of the support plate. The facing sheet also has indicia perforated therethrough such that light emitted by the electroluminescent sheet passes through the perforated indicia illuminating the perforated indicia in contrast to the facing sheet. Preferably, the novel license plates also comprise optional colored translucent sheets mounted on the support plate between the electroluminescent sheet and the facing sheet to vary the apparent color of the light emitted by the electroluminescent sheet. Also, the facing sheet preferably is suitable as a substrate for printed indicia.

14 Claims, 2 Drawing Sheets

5,692,327

1
ILLUMINATED LICENSE PLATE

FIELD OF THE INVENTION

This invention relates generally to illuminated license plates, and more particularly to illuminated license plates which may be more easily customized and mass produced at the same time.

BACKGROUND OF THE INVENTION

Over the years many designs for illuminated license plates have been proposed. Such license plates are highly desirable because illumination not only can improve the appearance of a license plate, but it also can make them more conspicuous. Thus, illuminated license plates can satisfy a consumer's desire for an attractive, stylish accessory to his automobile, while at the same time serving the public's need for conspicuous identification of vehicles, especially at night when identification by other means may be difficult.

Despite the considerable need for illuminated license plates, however, such plates have not been widely used to date. It is believed the lack of acceptance of illuminated plates stems from various defects in previously proposed designs.

For example, many designs are relatively complex and incorporate a relatively large number of parts which must be fabricated and assembled. Such designs are disclosed, for example, in U.S. Pat. No. 5,073,842 to G. Monroe and U.S. Pat. No. 4,475,298 to R. Munoz. The complexity of such designs can make them relatively expensive and difficult to produce in large quantities.

Other designs incorporate incandescent light bulbs, which periodically need replacement and often do not provide sufficiently bright and uniform illumination. The designs disclosed, for example, in Monroe '842, Munoz '298, and U.S. Pat. No. 4,255,887 to T. Murai are believed to suffer such deficiencies.

Many proposed designs also do not provide sufficient flexibility in varying the nature and color of indicia on the plate. For example, Murai '887 utilizes a perforated metallic plate with translucent inserts carried in the perforations. Perforating metallic plates is relatively difficult and expensive. Moreover, utilizing translucent inserts to vary the color of the illuminating light, or as disclosed in Munoz '298, using plates of different colored translucent plastic, is more difficult and expensive than is desired. Thus, such designs are not readily susceptible to production of large quantities of customized plates.

It is believed that the ability to produce large quantities of plates while preserving the ability to customize the indicia appearing on the plates is critical for the success of illuminated plates. Ideally, an illuminated license plate will be economically manufactured, yet will afford each prospective customer with a choice of indicia and colors.

It is an object of the subject invention, therefore, to provide improved illuminated license plates, and in particular, illuminated license plates which utilize a relatively simple design which may be easily and economically fabricated.

Another object is to provide such license plates wherein the indicia may be customized easily and economically according to the needs and desires of individual customers.

A further object is to provide such plates wherein the color of the illuminating light may be easily and economically varied as desired by individual customers.

2

Yet another object of the subject invention is to provide illuminated license plates which are durable and maintenance free even when exposed to relatively harsh conditions commonly encountered over the life of an automobile.

Another object is to provide such plates wherein all of the above mentioned advantages are realized.

Those and other objects and advantages of the invention will be apparent to those skilled in the art upon reading the following detailed description and upon reference to the drawings.

SUMMARY OF THE INVENTION

This invention provides for improved illuminated license plates. The novel license plates comprise a support, an electroluminescent sheet, and a facing sheet. The support includes a rigid, nonopaque plate. The rigid support plate has a front surface and a back surface. An electroluminescent sheet is mounted on the back surface of the support plate, preferably in a recess provided in the back surface for such purposes.

The facing sheet is nontransparent and is affixed to the front surface of the support plate. The facing sheet also has indicia perforated therethrough such that light emitted by the electroluminescent sheet passes through the perforated indicia illuminating the perforated indicia in contrast to the facing sheet.

Preferably, the novel license plates also comprise optional colored translucent sheets mounted on the support plate between the electroluminescent sheet and the facing sheet to vary the apparent color of the light emitted by the electroluminescent sheet. Also, the facing sheet preferably is suitable as a substrate for printed indicia.

As will become more apparent from the detailed description which follows, the novel license plates have a simple design which allows them to be manufactured cheaply and economically in large quantities while at the same time allowing each license plate to be customized according to the desires of individual customers.

DETAILED DESCRIPTION OF THE INVENTION

Figure 1:
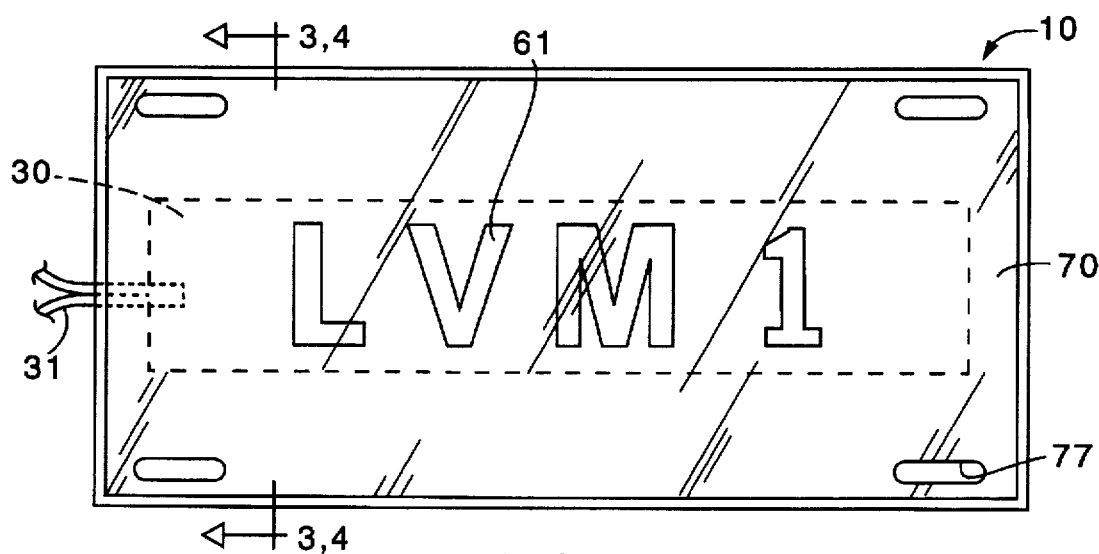
FIG. 1 is a front elevational and partial tear-away view of a first preferred embodiment 10 of the subject invention, which preferred embodiment is a customized license plate suitable for mounting on an automobile or other vehicle.
Figures 3, 4:
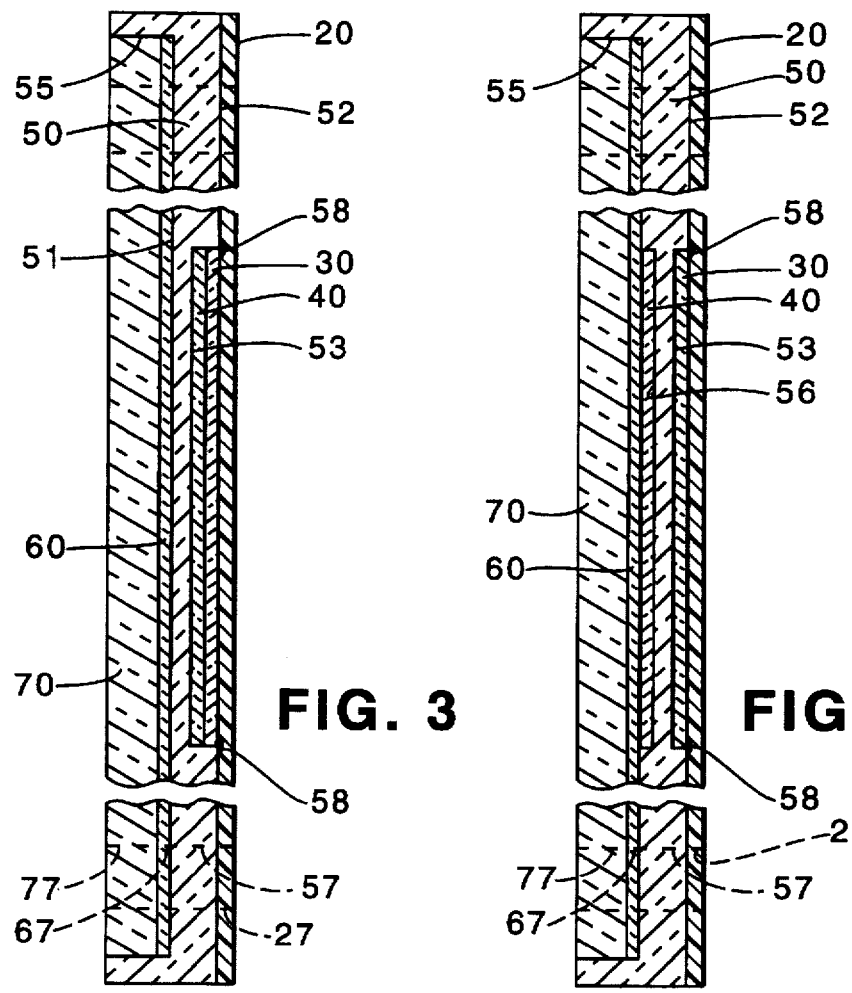
FIG. 3 is a cross-sectional view taken along line 3—3 of FIG. 1 showing the various components of the novel license plate as assembled.
FIG. 4 is a cross-sectional view similar to the view of FIG. 3 of a second preferred embodiment 110 of the subject invention.
Figure 2:
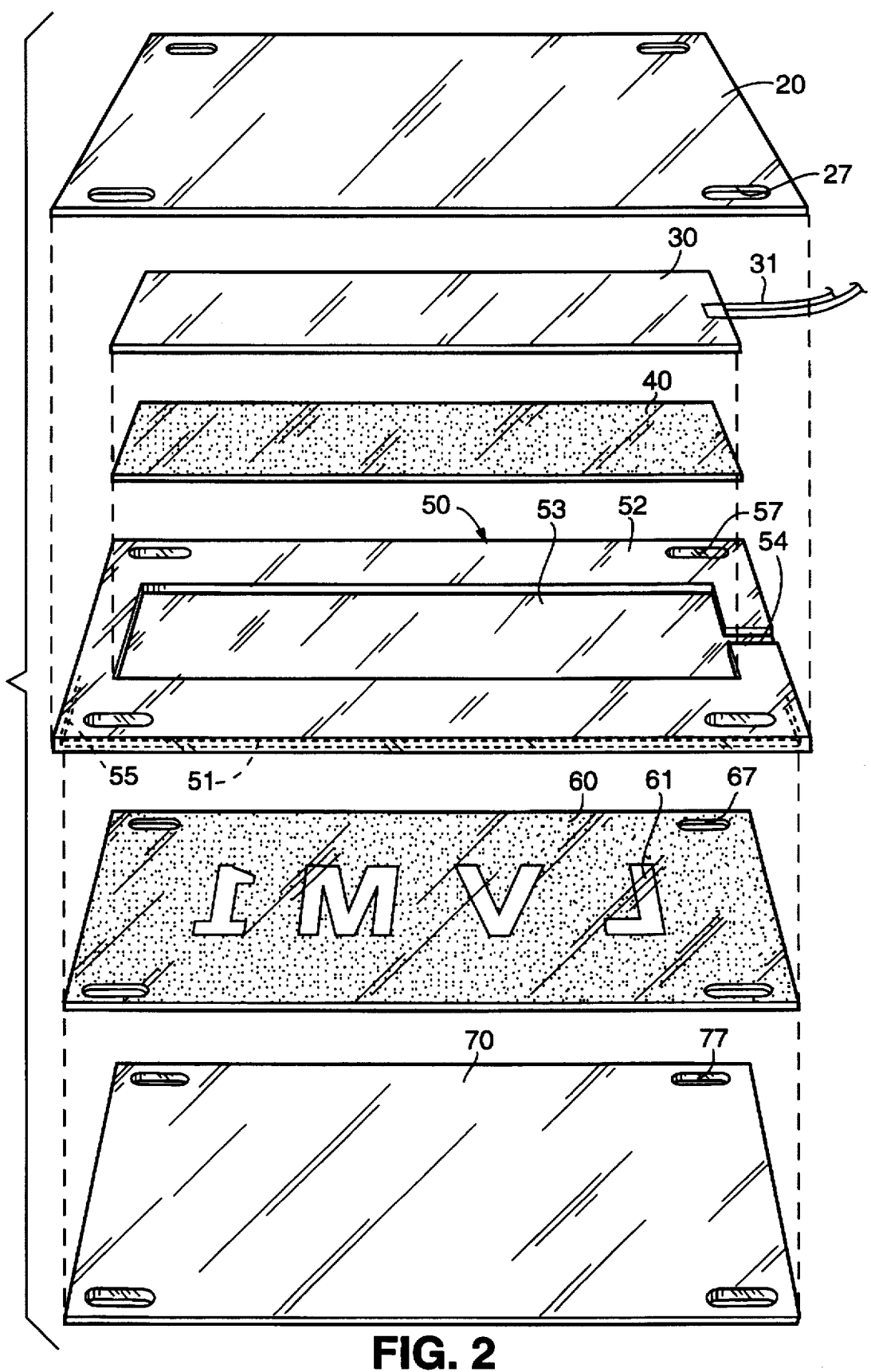
FIG. 2 is a perspective and exploded view of the license plate shown in FIG. I showing the various components thereof.

A first preferred license plate 10 constructed in accordance with the teachings of the subject invention is shown generally in FIGS. 1–3. Those skilled in the art, however, will readily appreciate that the subject invention is not limited to the disclosed license plate. On the contrary, the teachings of the subject invention can be employed in license plates of widely varying designs without departing from the scope of the invention.

The novel license plates comprise a support including a rigid, nonopaque, preferably transparent plate. An electroluminescent sheet is mounted on one side of the support plate, and a nontransparent facing sheet having perforated indicia is mounted on the other side of the support plate. Accordingly, as best seen in FIGS. 2–3, the license plate 10 includes support 50, electroluminescent sheet 30, and facing sheet 60.

Support 50 provides in large part the structural strength of the license plate and is designed to accommodate and carry electroluminescent sheet 30, facing sheet 60, and the other components of the plate 10. Accordingly, support 50 is composed of a rigid plate, i.e., of material which can be shaped into relatively thin plates yet will provide the structural strength normally associated with a license plate.

Support 50 preferably is transparent, but may be translucent as will be discussed below. It is essential, however, that the material be nonopaque, since support 50 is intended to allow light from the electroluminescent sheet 30 to pass therethrough.

By transparent, it is meant simply that the material allows a relatively wide spectrum of light to pass therethrough. Preferably, the light will pass with relatively little diffusion as well. By translucent it is meant that the material will pass a narrower band of light such that the material appears to the observer to have a tint. By opaque it is meant that little or no light passes through the material.

In accordance with the foregoing, the support 50 preferably is composed of a transparent polymeric material such as a polycarbonate. Preferably, the polycarbonate incorporates UV stabilizers to prevent yellowing of the material over the expected life of the plate. Polycarbonates provide excellent mechanical strength even in relatively thin sheets. Moreover, the polycarbonate may be easily molded or machined to provide the various features of the support 50 discussed below.

Polycarbonate resins suitable for injection molding are available commercially, for example, from GE Plastics. Suitable polycarbonate sheets are available from various commercials sources including GE Plastics. It will be appreciated, however, that other nonopaque materials and especially other structural plastics may be used, such as polyacrylates. Indeed, a wide variety of suitable materials are known and may be used in accordance with the foregoing considerations.

The support 50, in accordance with the subject invention, includes a front surface 51 and a back surface 52. The electroluminescent sheet 30 is mounted on the back surface 52 of support 50, and preferably is disposed in a recess 53 provided in the back surface 52 for that purpose. A channel 54 also is provided in the back surface 52 of support 50. The channel 54 extends from recess 53 to an edge of support 50 and is sized to accommodate electrical leads 31 extending from the electroluminescent sheet 30.

The novel plates preferably include a moisture resistant seal which extends between the periphery of the electroluminescent sheet and back surface of the support. For example, in plate 10 a bead of silicone sealant 58 is laid down around the periphery of electroluminescent sheet 30. The bead 58 is intended to prevent the accumulation of moisture between the electroluminescent sheet 30 and the support 50 in amounts that may detract from the appearance of the plate 10. The bead 58 also serves to retain the sheet 30 in recess 53.

UV curable silicone sealants are available from various commercial sources, including Loctite Corporation. It will be appreciated, however, that other means of sealing and mounting the electroluminescent sheet are known and may be used. A moisture resistant gasket, for example, may be used to provide a seal. Likewise, conventional adhesives and fasteners may be used to secure the electroluminescent sheet 30 to support 50.

Plate 10 also includes back sheet 20. Back sheet 20 preferably is a self-adhesive vinyl sheet which covers the entire back surface of support 50. While not essential to the invention, it will be appreciated that back sheet 20 serves to further secure electroluminescent sheet 30 to support 50, to further prevent moisture from accumulating between sheet 30 and support 50, discourages tampering with the plate 10, and enhances the overall appearance of the plate 10.

The electroluminescent sheet 30 itself is of conventional design. Such sheets typically include phosphorescent materials which are dispersed on a thin sheet of conductive material, the entire laminate structure being enveloped in a suitable protective, transparent polymer. They are available from a number of commercial sources, including Leading Edge Industries, Inc., Minnetonka, Minn.

The electroluminescent sheet is provided with suitable leads and connectors which allow the plate 10 to be connected to the electrical system of a vehicle, preferably the circuit controlling the parking lights of the vehicle. A variety of suitable leads and connectors are known and may be used. Preferably, channel 54 in support 50 is filed with a sealant, such as a UV curable silicone sealant, to prevent moisture damage to the connectors.

Electroluminescent sheets, however, are available in a relatively limited number of colors such as green, amber, blue, and white. Ideally, a consumer would have a wider choice of colors available to him. The novel license plates, therefore, preferably include a translucent sheet which is mounted on the support plate between the electroluminescent sheet and the facing sheet. By varying the tint of the translucent sheet, the apparent color of the electroluminescent sheet can be varied.

For example, license plate 10 has a translucent sheet 40 which is disposed in the recess 53 forward of the electroluminescent sheet 30. Alternately, as in the second preferred embodiment 110 shown in FIG. 4, the translucent sheet 40 is disposed in a recess 56 provided in the front surface 51 of support 50 for that purpose. (The construction of license plate 110 shown in FIG. 4 is otherwise identical to that of license plate 10 shown in FIGS. 1–3, like reference numerals being used in all figures to refer to like structures.)

Translucent sheet 40 preferably is a tinted polymer sheet. Tinted vinyl sheets are available in a wide variety of colors from a number of commercial sources, such as Roscolux vinyl sheets available from Rosco Company, 36 Bush Ave., Port Chester, N.Y. 10573. It will be appreciated, however, that other suitable tinted sheets are known and may be used. It also will be appreciated that the apparent color of the light being emitted from the electroluminescent sheet may be varied by tinting the support 50 if desired.

The novel license plates also comprise a nontransparent, preferably opaque facing sheet which is mounted on the front surface of the support plate. Indicia are perforated through the facing sheet. It will be appreciated, therefore, that light emitted by the electroluminescent sheet will be visible only in the perforated areas, thus effectively illuminating the indicia and rendering them in stark contrast to the remainder of the facing sheet. Moreover, since the support 50 is adapted to provide the primary support for the plate 10, the facing sheet may be made from relatively soft materials which may be easily perforated.

Accordingly, license plate 10 has a facing sheet 60 which is mounted on the front surface 51 of support 50. Ribs 55 extend upwardly from the front surface 51 of support 50 at the edge thereof. Ribs 55 define the area on which facing sheet 60 is mounted and provide a means for locating the facing sheet 60 during assembly of the plate 10. Ribs 55 also serve to reinforce the support 50 and to provide a more finished edge to the plate 10.

Suitable indicia 61, as desired by the customer or as required by state regulations, are provided in the facing sheet 60 by appropriately shaped perforations. Preferably, the facing sheet 60 provides a suitable substrate for printed indicia as well. This will allow the facing sheet to be printed with various backgrounds to comply with state regulations or to meet consumer tastes.

Accordingly, facing sheet 60 preferably is fabricated from a self-adhesive vinyl sheet. Suitable calendared and cast vinyl films having a peel and stick adhesive backing are available commercially from a number of sources, for example, from Earl Mich Company, Chicago, Ill. Such materials are relatively inexpensive and can be easily handled. They may be perforated much more easily than metallic plates, yet they also provide a suitable substrate for printed indicia and have excellent weathering characteristics. It will be appreciated that other suitable polymer sheet materials are known and may be used. Likewise, other adhesives and fasteners may be used.

Preferably, the novel plates also include a transparent cover mounted over the facing sheet. Although polymer facing sheets such as the preferred vinyl sheeting have excellent wear capabilities, a cover provides protection for the facing sheet, discourages tampering with the product, and can enhance the overall appearance of the plate.

Accordingly, plate 10 is provided with cover 70 which is mounted over the facing sheet 60 in the recess defined by ribs 55 of support 50 by adhesives or a suitable fastener. A UV curable silicone sealant as used elsewhere in the plate 10 preferably is used to provide adhesion and sealing, but other adhesives may be used.

Cover 70 is milled from a scratch resistant polycarbonate sheet material which incorporates a UV stabilizer to prevent yellowing. Such polycarbonate sheet material is available commercially, for example, Lexan MR5 polycarbonate from GE Plastics. Such materials are highly transparent, very scratch resistant, weather well, and can be machined relatively easily. They also add to the mechanical strength of the plate, and accordingly, when such covers are employed it will be appreciated that the support plate may be made somewhat thinner. Of course, other transparent materials are known and may be used as a cover, such as polyacrylates and other transparent polymeric materials.

A cover is also preferred because the facing sheet then may be constructed from materials which otherwise would be unsuitable. That is, in the absence of a cover, the facing sheet must be relatively durable and weather resistant. When a cover is used, however, less expensive substrates may be used since the cover can provide protection from physical and weather related damage. Such substrates also may accept less expensive inks as compared to those which are used to print vinyl substrates.

The novel license plates are adapted to be mounted on an automobile or other vehicle. Accordingly, plate 10 is provided with apertures 27, 57, 67, 77 which pass through, respectively, back sheet 20, support 50, facing sheet 60, and cover 70. Those apertures are designed to accommodate the passage of bolts by which the plate 10 may be secured to brackets and the like as is common with conventional license plates. Of course, other means of mounting the novel plates to a vehicle may be used and a wide variety of such means are known to workers in the art.

From the foregoing it will be appreciated that the novel license plates have a relatively simple design which may be easily and economically fabricated. Especially when the preferred materials are employed, the novel plates are strong, lightweight, and durable and are expected to maintain their functional and aesthetic character over a life of five years or more. Importantly, however, the novel plates may be economically produced without sacrificing the ability to customize the plate.

In particular, a significant portion of the assembly may be undertaken prior to receiving an order. That is, the electroluminescent sheet and, if desired, a translucent sheet may be mounted on the support, the necessary connections and leads may be connected to the electroluminescent sheet, and, if desired, the back sheet applied. This support subassembly will be common to all plates which will be produced in a particular color. When the translucent sheet is mounted on the front surface of the support, however, it will be appreciated that the color may be varied after the support subassembly is completed.

Once an order is received, the facing sheet may be perforated with the appropriate indicia by a computer assisted cutting machine. The facing sheets can be preprinted to provide stock backgrounds which conform to state regulations, which incorporate university or team logos, or which appeal to various potential consumers.

We claim:

1. An illuminated license plate adapted for mounting on a vehicle, said license plate comprising:
   a support including a rigid, nonopaque plate having a front surface and a back surface, said support plate having a recess in its back surface;
   an electroluminescent sheet being disposed in said recess in said back surface of said support plate;
   a nontransparent facing sheet mounted on said front surface of said support plate and having indicia perforated therethrough such that light emitted by said electroluminescent sheet passes through said perforated indicia and illuminates said perforated indicia in contrast to said facing sheet; and
   a translucent sheet mounted on said support plate between said electroluminescent sheet and said facing sheet, said translucent sheet being disposed in said recess behind said facing sheet, said electroluminescent sheet emitting light of a first color and said translucent sheet transmitting light of a second color such that light passing through said perforated indicia is a third color.

2. The illuminated license plate of claim 1, wherein said support plate is composed of a transparent polymeric material.

3. The illuminated license plate of claim 1, wherein said support plate is composed of polycarbonate.

4. The illuminated license plate of claim 1, wherein said electroluminescent sheet has a periphery, and said illuminated license plate further comprises a moisture resistant seal extending between the periphery of said electroluminescent sheet and said back surface of said support plate.

5. The illuminated license plate of claim 1, wherein said illuminated license plate further comprises a back sheet mounted on said support plate back surface.

6. The illuminated license plate of claim 5, wherein said back sheet is a self-adhesive polymeric sheet.

7. The illuminated license plate of claim 1, wherein said support plate includes a groove extending from said back recess to an edge of said support plate and adapted to accommodate electrical leads from said electroluminescent sheet.

8. The illuminated license plate of claim 1, wherein said translucent sheet is disposed in said recess forward of said electroluminescent sheet.

9. The illuminated license plate of claim 1, wherein said facing sheet is opaque.

10. The illuminated license plate of claim 1, wherein said facing sheet is a polymeric material providing a substrate for printed indicia.

11. The illuminated license plate of claim 1, wherein said facing sheet is a vinyl sheet.

12. The illuminated license plate of claim 1, wherein said facing sheet is a self-adhesive sheet.

13. The illuminated license plate of claim 1, wherein said illuminated license plate further comprises a transparent cover extending over said facing sheet.

14. An illuminated license plate adapted for mounting on a vehicle, said license plate comprising:

a support including a rigid, nonopaque plate having a front surface and a back surface, said support plate having a recess in its back surface, wherein said support plate includes a groove extending from said back recess to an edge of said support plate;

an electroluminescent sheet being disposed in said recess in said back surface of said support plate, said groove in said support plate being adapted to accommodate electrical leads from said electroluminescent sheet; and a nontransparent facing sheet mounted on said front surface of said support plate and having indicia perforated therethrough such that light emitted by said electroluminescent sheet passes through said perforated indicia and illuminates said perforated indicia in contrast to said facing sheet.

* * * * *